(12) United States Patent
Mittmann

(10) Patent No.: US 6,987,465 B2
(45) Date of Patent: Jan. 17, 2006

(54) PROCEDURE FOR THE DETERMINATION OF AN ABSOLUTE POSITION

(75) Inventor: Rudolf Mittmann, Tacherting (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 165 days.

(21) Appl. No.: 10/671,325

(22) Filed: Sep. 25, 2003

(65) Prior Publication Data

US 2004/0133844 A1 Jul. 8, 2004

(30) Foreign Application Priority Data

Sep. 25, 2002 (DE) .......................... 102 44 547

(51) Int. Cl.
H03M 1/22 (2006.01)

(52) U.S. Cl. .......................... 341/15; 341/16
(58) Field of Classification Search .................. 341/15, 341/16; 250/231.13, 231.16, 231.18
See application file for complete search history.

(56) References Cited

U.S. PATENT DOCUMENTS

| | | | |
|---|---|---|---|
| 4,631,519 A | | 12/1986 | Johnston |
| 5,138,560 A | | 8/1992 | Lanfer et al. |
| 5,754,568 A | * | 5/1998 | Braasch ................... 714/799 |
| 6,038,523 A | * | 3/2000 | Akahane et al. ........... 702/150 |
| 6,483,104 B1 | * | 11/2002 | Benz et al. ............. 250/231.13 |
| 6,570,104 B1 | * | 5/2003 | Ericson et al. ........... 178/18.09 |
| 6,760,682 B1 | * | 7/2004 | Schwabe .................. 702/150 |
| 2004/0129870 A1 | * | 7/2004 | Strasser ................ 250/231.13 |
| 2005/0072016 A1 | * | 4/2005 | Strasser et al. ............... 33/706 |

FOREIGN PATENT DOCUMENTS

| | | |
|---|---|---|
| DE | 195 06 019 A1 | 9/1996 |
| DE | 195 06 019 C2 | 4/2000 |
| EP | 0 841 538 A1 | 5/1998 |
| EP | 0 789 226 B1 | 6/2001 |

OTHER PUBLICATIONS

B.E. Jones, "Digital displacement transducer using pseudo-random binary sequences and a microprocessor," Trans Inst M C vol. 3, No. 1 Jan.–Mar. 1981, pp. 13–20.

* cited by examiner

Primary Examiner—Peguy JeanPierre
Assistant Examiner—Joseph Lauture
(74) Attorney, Agent, or Firm—Brinks Hofer Gilson & Lione

(57) ABSTRACT

A procedure for determining an absolute position of an object, which includes scanning a code pattern from a series of code patterns, wherein each code pattern of said series of code patterns unambiguously defines one absolute position and comprises a plurality of code elements. Forming a code word with a plurality of bits by the scanning the code pattern. Checking the plurality of bits of the code word for reliability, and if one of said plurality of bits fails to attain predetermined criteria, it is assigned an error code. Predetermining a series of bit strings, with one absolute position being unambiguously assigned to each one of the series of bit strings. Comparing the bits of the code word with the predetermined series of bit strings, and if a match of all of the bits of the code word and the predetermined series of bits strings occurs, assigning a corresponding absolute position to the code word, and upon comparison for a match, any bits assigned an error code are not taken into account.

14 Claims, 4 Drawing Sheets

FIG. 4

3-Bit PRC -> 1110100 | 011101 |

Cyclical expansion

Table of Association

```
Position            Address

First Position:     111010
Second Position:    110100
Third Position:     101000
Fourth Position:    010001
Fifth Position:     100011
Sixth Position:     000111
Seventh Position:   001110
Eighth Position:    011101
```

FIG. 5a

```
Position:   111010  110100  101000  010001  100011  000111  001110  011101
Scanning:   110100  110100  110100  110100  110100  110100  110100  110100
Comparison: xx___x  xxxxxx  x___xx  _xx_x_  x_x___  __xx__  ___x_x  _x_xx_
```

Result : One match for a predetermined Second position → Position valid

FIG. 5b

```
Position:   111010  110100  101000  010001  100011  000111  001110  011101
Scanning:   F10100  F10100  F10100  F10100  F10100  F10100  F10100  F10100
Comparison: xx___x  xxxxxx  x___xx  xxx_x_  x_x___  x_xx__  x__x_x  xx_xx_
```

Result : One match for a predetermined Second position → Position valid

FIG. 5c

| Position:  | 111010 | 110100 | 101000 | 010001 | 100011 | 000111 | 001110 | 011101 |
|---|---|---|---|---|---|---|---|---|
| Scanning   | F10F00 | F10F00 | F10F00 | F10F00 | F10F00 | F10F00 | F10F00 | F10F00 |
| Comparison | xx_x_x | xxxxxx | x__xxx | xxxxx_ | x_xx__ | x_xx__ | x__x_x | xx_xx_ |

Result : One match for a predetermined. Second position 1 -> Position valid

FIG. 5d

| Position:  | 111010 | 110100 | 101000 | 010001 | 100011 | 000111 | 001110 | 011101 |
|---|---|---|---|---|---|---|---|---|
| Scanning   | F10FF0 | F10FF0 | F10FF0 | F10FF0 | F10FF0 | F10FF0 | F10FF0 | F10FF0 |
| Comparison | xx_xxx | xxxxxx | x__xxx | xxxxx_ | x_xxx_ | x_xxx_ | x__xxx | xx_xx_ |

Result : One match for a predetermined Second position -> Position valid

FIG. 5e

| Position:  | 111010 | 110100 | 101000 | 010001 | 100011 | 000111 | 001110 | 011101 |
|---|---|---|---|---|---|---|---|---|
| Scanning   | F10F0F | F10F0F | F10F0F | F10F0F | F10F0F | F10F0F | F10F0F | F10F0F |
| Comparison | xx_x_x | xxxxxx | x__xxx | xxxxx_ | x_xx_x | x_xx_x | x__x_x | xx_xxx |

Result : Two matches for a predetermined second position and fourth position -> Scanning invalid, position cannot be determined

FIG. 5f

| Position:  | 111010 | 110100 | 101000 | 010001 | 100011 | 000111 | 001110 | 011101 |
|---|---|---|---|---|---|---|---|---|
| Scanning   | 110000 | 110000 | 110000 | 110000 | 110000 | 110000 | 110000 | 110000 |
| Comparison | xx_x_x | xxx_xx | x__xxx | _xxxx_ | x_xx__ | __x___ | _____x | _x__x_ |

Result : No matches -> Erroneous bits are included that were not marked

PROCEDURE FOR THE DETERMINATION OF AN ABSOLUTE POSITION

Applicant claims, under 35 U.S.C. §119, the benefit of priority of the filing date of Sep. 25, 2002 of a German patent application, copy attached, Serial Number 102 44 547.8, filed on the aforementioned date, the entire contents of which is incorporated herein by reference.

BACKGROUND OF THE INVENTION

1. Field of the Invention

The present invention relates to a procedure for the determination of an absolute position and to a position measuring instrument for forming the procedure.

2. Discussion of Related Art

In many fields, to determine the position of two bodies moved relative to one another, absolute position measuring instruments are increasingly being used. Absolute position measuring instruments have the advantage over systems that measure purely incrementally that in every relative position, even after the energy supply has been interrupted, a correct position information can be output immediately.

The absolute position is embodied by a code, which is arranged in a plurality of tracks extending parallel to one another, for instance in the form of a gray code.

Arranging the position information in a single code track, with code elements in line with one another in the measurement direction, is especially space-saving. The code elements are disposed in a pseudo-random distribution one after another, so that a certain number of successive code elements each form one code pattern or bit pattern that unambiguously defines the absolute position as a code word. When the scanning instrument is shifted by a single code element, a new bit pattern is already formed, and over the entire measurement range to be detected in absolute form, a sequence of different code words is available. This kind of sequential code is known as a chain code or a pseudo-random code.

In position measuring instruments, partial soiling or contamination of the scale can for instance cause errors in the bit string that forms the code word, and these cause an erroneous determination of the absolute position.

Methods for detecting such an error have already been proposed. In European Patent Disclosure EP 0 789 226 B1, it is proposed to this end that at least three complete, different code patterns from the scale be scanned simultaneously with a scanner and code words be formed from that. The actual spacings of the code words are compared with the set-point spacings, and as a result, from the simultaneously detected code words, one code word recognized as correct is used to determine the instantaneous absolute position, and code words detected as erroneous are excluded from further processing.

This method enhances the reliability and operating safety of a position measuring instrument. A disadvantage, however, is that a code word is already rejected as erroneous if only a single bit of the bit string is erroneous. To attain high reliability and operating safety of the position measuring instrument, many code words must be scanned simultaneously.

In German Patent DE 195 06 019 C2, a method for error recognition is described. In it, it is assumed that upon a change of position, the new code word must match a code word of the previous measuring step or the next measuring step. Only if the new code word matches a neighboring code word is the new code word assigned an absolute position. An error routine for determining an error is also disclosed. In it, bits of the new code word are inverted successively and compared for a match with the corresponding bit of the neighboring code words. This routine is performed until a match of the new code word with a neighboring code word is found. The bits that have to be inverted for the match are found to be erroneous, so that malfunctioning detector elements can also be detected. By this method, only error checking is possible.

OBJECT AND SUMMARY OF THE INVENTION

An object of the present invention is to disclose a procedure with which an error-tolerant and nevertheless reliable determination of an absolute position is assured.

This object is attained according to the present invention by a procedure for determining an absolute position of an object, which includes scanning a code pattern from a series of code patterns, wherein each code pattern of said series of code patterns unambiguously defines one absolute position and comprises a plurality of code elements. Scanning additional code elements, forming a code word with a plurality of bits by the scanning the code pattern and forming additional bits from the scanning said additional code elements. Checking the plurality of bits of the code word and said additional bits for reliability, and if one of said plurality of bits and the additional bits fails to attain predetermined criteria, it is assigned an error code. Predetermining a series of bit strings, with one absolute position being unambiguously assigned to each one of the series of bit strings. Comparing the bits of the code word with the predetermined series of bit strings and comparing the additional bits with corresponding bits from the predetermined series of bit strings, and if a match of all of the bits of the code word and the predetermined series of bits strings occurs, assigning a corresponding absolute position to the code word, and upon comparison for a match, any bits assigned an error code are not taken into account.

This object is also attained by a procedure for determining an absolute position of an object, which includes scanning a code pattern from a series of code patterns, wherein each code pattern of said series of code patterns unambiguously defines one absolute position and comprises a plurality of code elements. Forming a code word with a plurality of bits by the scanning the code pattern. Checking the plurality of bits of the code word for reliability, and if one of said plurality of bits fails to attain predetermined criteria, it is assigned an error code. Predetermining a series of bit strings, with one absolute position being unambiguously assigned to each one of the series of bit strings. Comparing the bits of the code word with the predetermined series of bit strings, and if a match of all of the bits of the code word and the predetermined series of bits strings occurs, assigning a corresponding absolute position to the code word, and upon comparison for a match, any bits assigned an error code are not taken into account.

This object is also attained by a position measuring instrument that includes a code that has a series of code patterns, wherein each code pattern of the series of code patterns unambiguously defines one absolute position and has a plurality of code elements. A scanner that is movable in a measurement direction relative to the code, the scanner including a light source that generates light that scans the code so that the code generates modulated light. A detector that detects the modulated light and generates scanning signals. An evaluation unit that receives said scanning signals and forms a code word with a plurality of bits and forms additional bits from scanning the code. The evaluation unit checking the plurality of bits of the code word and the additional bits for reliability, and if one of the plurality of bits and the additional bits fails to attain predetermined criteria, it is assigned an error code. The evaluation unit further predetermining a series of bit strings, with one absolute position being unambiguously assigned to each one of the series of bit strings and comparing the bits of the code word with the predetermined series of bit strings and comparing the additional bits with corresponding bits from the predetermined series of bit strings, and if a match of all of the bits of the code word and the predetermined series of bits strings occurs, assigning a corresponding absolute position to the code word, and upon comparison for a match, any bits assigned an error code are not taken into account.

An advantage attained with the present invention is that not all erroneous code words have to be excluded. With the procedure, individual erroneous bits in a code word are tolerated. The likelihood that a correct absolute position can be detected by scanning a relatively small code region is very high, and therefore according to the present invention, the operating safety and functional capability of the position measuring instrument are enhanced.

Further advantages, as well as details of the present invention ensue, from the subsequent description of exemplary embodiments by the attached drawings.

BRIEF DESCRIPTION OF THE DRAWINGS

FIG. 4 shows possible code words with redundant scanning and assigned absolute positions in accordance with the present invention;

FIG. 5a shows an embodiment of a comparison routine without an erroneously scanned bit in accordance with the present invention;

FIG. 5b shows a second embodiment of a comparison routine shown in FIG. 5a with a bit found to be erroneous in accordance with the present invention;

FIG. 5c shows a third embodiment of a comparison routine with two bits found to be erroneous in accordance with the present invention;

FIG. 5d shows a fourth embodiment of a comparison routine with a first array of three bits found to be erroneous in accordance with the present invention; and FIG. 5e shows a fifth embodiment of a comparison routine with a second array of three bits found to be erroneous in accordance with the present invention; and FIG. 5f shows a sixth embodiment of a comparison routine with erroneous bits, which however were not recognized as erroneous in accordance with the present invention.

DETAILED DESCRIPTION OF THE PREFERRED EMBODIMENTS

Figure 1:
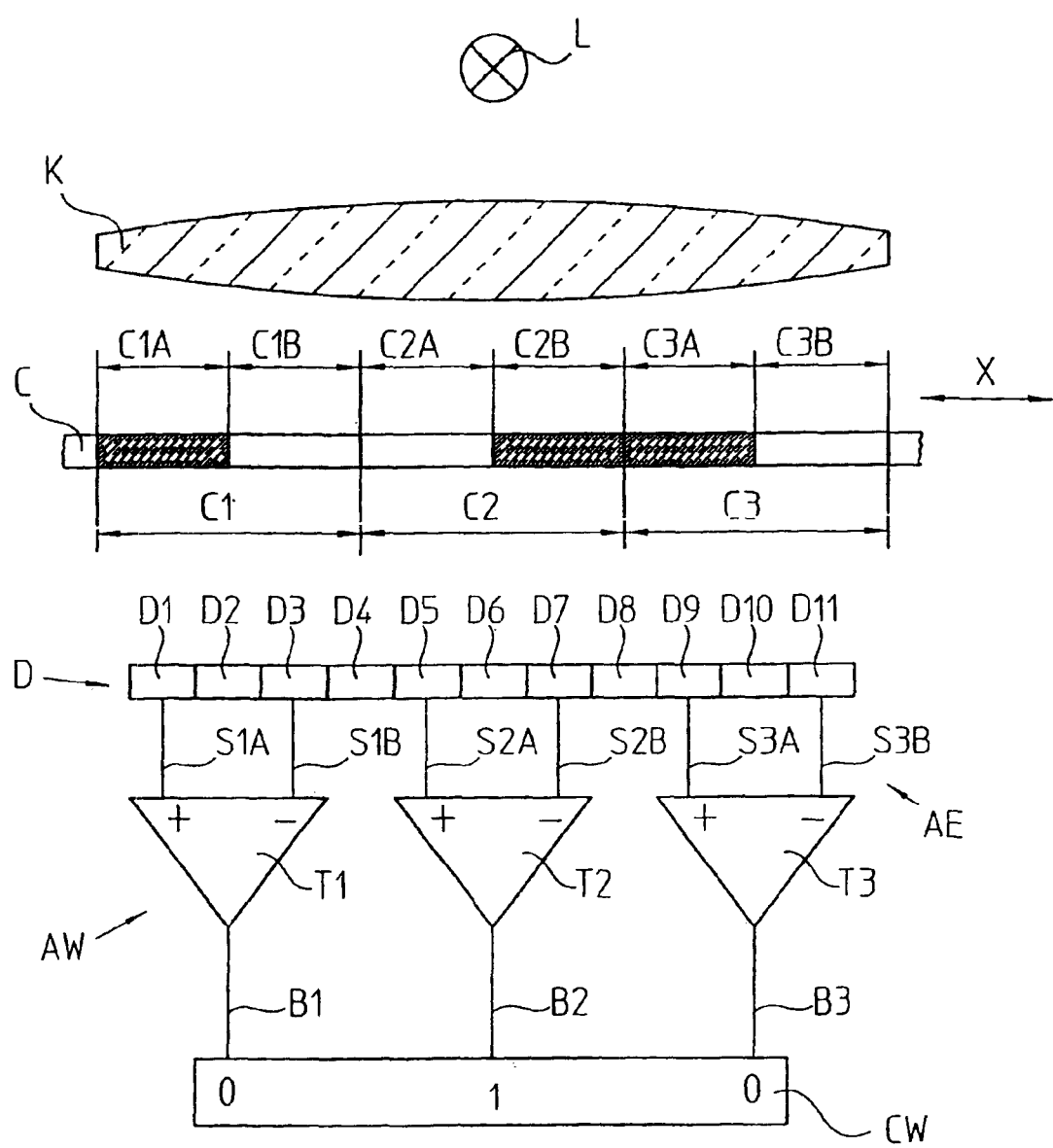
FIG. 1 schematically shows an embodiment of a position measuring instrument in accordance with the present invention.

In FIG. 1, a length measuring instrument is shown schematically. This length measuring instrument operates by the optical scanning principle, in which a code C is scanned by the transmitted-light method. For scanning the code C, a scanner AE is used, which is disposed movably in the measurement direction X relative to the code C.

The code C includes a series of equal-length code elements C1, C2, C3 succeeding one another in the measurement direction X. Each code element C1, C2, C3 in turn includes two equal-length partial regions A and B, disposed side by side in immediate succession in the measurement direction X, which are embodied as complementary to one another. Complementary means that they have inverse properties; that is, in the optical scanning principle they are transparent and nontransparent, or with incident light scanning they are reflective and nonreflective, respectively. Such a code is also called a Manchester code.

The sequential code C is scanned by the scanner AE, which includes a light source L whose light, via a collimator lens K, illuminates a plurality of successive code elements C1, C2, C3. The light is modulated by the code C as a function of position, so that downstream of the code C, a position-dependent light distribution occurs that is detected by a detector unit D of the scanner AE.

The detector unit D is a line sensor, with a series of detector elements D1–D11 disposed in the measurement direction X. In every relative position, at least one detector element D1–D11 is unambiguously associated with each partial region A, B of the code elements C1, C2, C3, so that in every relative position of the detector unit D relative to the code C, one scanning signal S1A–S3B is obtained from each partial region A, B. These scanning signals S1A–S3B are delivered to an evaluation device AW, which compares the respective two scanning signals S1A, S1B; S2A, S2B; S3A, S3B of the two partial regions C1A, C1B; C2A, C2B; C3A, C3B of a given code element C1, C2, C3 with each other and as a result of this comparison generates a digital value, or a bit B1, B2, B3, for each code element C1, C2, C3. In the Manchester code C, the digital value B1 is dependent on the order of the partial regions C1A and C1B. A string of a plurality of digital values B1, B2, B3 yields a code word CW which defines the absolute position. Upon a displacement of the detector unit D relative to the code C by the width or length of one code element C1, C2, C3, a new code word CW is generated, and over the measurement range to be measured absolutely, many different code words CW are formed.

FIG. 1 shows an instantaneous position of the code C relative to the scanner AE. The detector elements D1–D11 are disposed in succession, at a spacing of half the width of one partial region C1A–C3B of the code C. This assures that in every position, at least one detector element D1–D11 is unambiguously associated with one partial region C1A–C3B and does not scan a transition between two partial regions C1A–C3B. In the position shown, the partial region C1A is being scanned by the detector element D1 and the partial region C1B by the detector element D3. The detector elements D1, D3 detect the light distribution, and as a function of the light intensity, they generate analog scanning signals S1A, S1B in proportion to the light intensity. Since the two partial regions C1A and C1B are embodied in complementary form to one another, the intensity of the scanning signals S1A and S1B is also inverse to one another; that is, the signal levels are far apart from one another.

This signal spacing is now utilized to generate the binary information B1, by checking which of the two scanning signals S1A, S1B of the code element C1 is the greater. This checking can be done by division or subtraction. In this example, subtraction is employed, for which purpose a trigger component T1 serves in FIG. 1 as a comparator. The trigger component T1 generates B1=0 if S1A is less than S1B, and it generates B1=1 if S1A is greater than S1B. In the same way, binary data B2 and B3 are obtained by trigger components T2, T3, by scanning the code elements C2, C3 and comparing the analog scanning signals S2A, S2B; S3A, S3B of each of the partial regions C2A, C2B; C3A, C3B of a respective code element C2, C3.

Thus a first digital value is assigned to a first sequence of the complementary partial regions A, B, and a second digital value is assigned to a second sequence of the complementary partial regions A, B. In this example, the value 0 is assigned to the sequence opaque→transparent, and the value 1 is assigned to the sequence transparent→opaque.

Since the two partial regions A and B of each code element C1, C2, C3 are complementary to one another, the signal-to-noise ratio of the scanning signals S is very high. A variation in the light intensity L of the light source 3 affects the scanning signals S of both partial regions A and B equally.

Because of the complementary design of each two partial regions A, B of a code element C1, C2, C3, analog signals S whose difference exceeds a predetermined value must be generated in each case from scanning of these partial regions A, B, if the position measuring instrument is functioning correctly. By observation of this differential value, good error checking is possible. The basis of this error checking is that it can be assumed that if the differential value fails to be attained by a predetermined amount, the binary information B1 is uncertain, and for that binary information B1, an error signal F is therefore generated.

Figure 2:
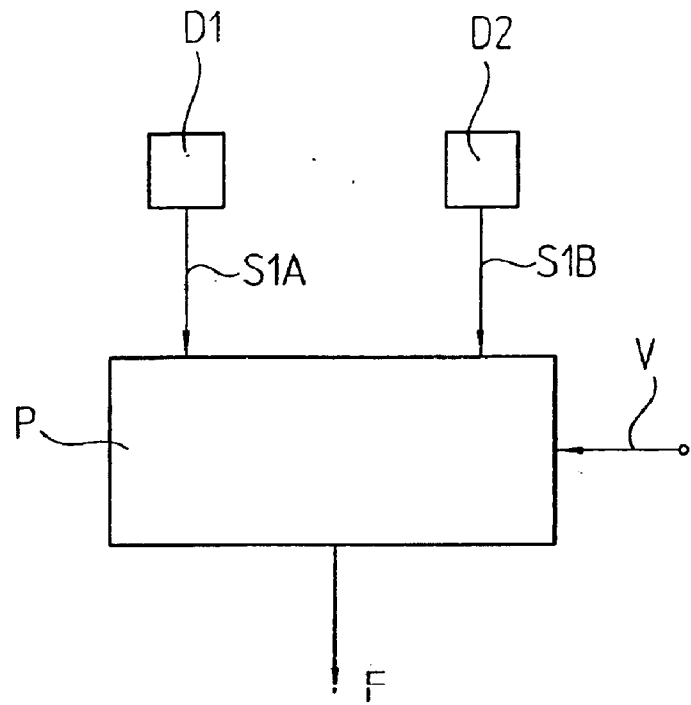
FIG. 2 schematically shows a principle of error checking in accordance with the present invention.
Figure 3:
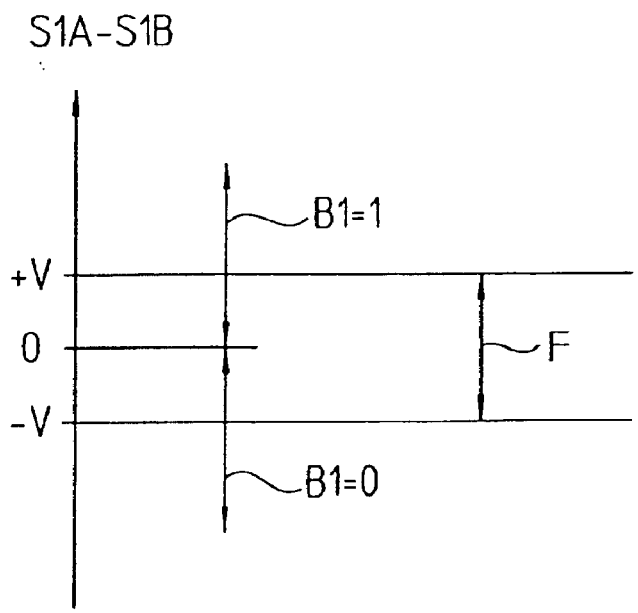
FIG. 3 shows examples of signals for error checking of FIG. 2.

The principle of generating the error signal F is shown in FIG. 2, for the code element C1. The analog scanning signals S1A and S1B of the code element C1 are delivered to an error checker P that is part of the evaluation unit. The error checker P compares S1A and S1B by subtraction (S1A−S1B) and checks whether the amount of the difference exceeds a predetermined comparison value V, or not. If the differential amount (S1A−S1B) does not exceed the predetermined comparison value V, an error signal F is output. These signal relationships are shown In FIG. 3. This error checking is performed for the scanning signals to generate all the bits B1, B2, B3 of a code word CW. Note that the method of determining an absolute position of an object as described herein and claimed is performed by the structures schematically shown in FIGS. 1 and 2. In actual use, the function blocks of FIGS. 1 and 2 will preferably not be present separately, but instead will be provided as gate arrays, or in a microprocessor.

By this error checking of the analog scanning signals S, the reliability of the bits B1, B2, B3 generated is checked. If predetermined criteria fail to be met—in this example, the signal amplitudes of two analog scanning signals S used to form one bit B1, B2, B3—then an error code F is assigned to this bit that has been found unreliable.

The disposition of the two partial regions A and B of each code element C1, C2, C3 in direct succession next to one another in the measurement direction X has the advantage that the detector elements D1–D11 can be disposed next to one another at a slight spacing in the measurement direction X, and the position measuring instrument thus becomes insensitive to rotation of the detector unit D relative to the code C or in other words to moiré fluctuations. The sensitivity to interference from soiling is also slight, since it can be assumed that both partial regions A and B of one code element C1, C2, C3 are affected equally.

The error checking can also be performed on the basis of digital scanning signals of each two partial regions A, B. An error signal is output whenever it is detected that the digital scanning signals of the partial regions A, B of one code element are not inverse (0→1 or 1→0) to one another.

For determining the absolute position (decoding) from the scanned code word CW, various methods are known. A common feature of all these methods is that a series of bit strings, each with N bits, is predetermined, and one absolute position is unambiguously assigned to each of these bit strings. The predetermined series of bit strings then corresponds to the series of code words CW that can be generated, given correct operation, by scanning of the code C. By comparing the N bits of a scanned code word CW with N bits of the predetermined series of each of the bit strings, an absolute position can thus be unambiguously assigned to each code word CW.

One possible way of predetermining the bit strings is to provide a memory with a table of association in the form of a ROM. The association of bit string to position is stored in the memory. For associating the absolute position with a scanned code word CW, or in other words for decoding, the code word CW forms the address for the table of association, so that the position associated with this address appears at the output (see FIG. 4). The decoding is necessary, in order to standardize the code words CW. The most common decoding is conversion into a binary code; in this example, then CW=111→position 1=000; CW=110→position 2=001; CW=101→position 3=010, etc.

A further possible way of predetermining the bit string is generation by a predetermined rule of generation in which the generating step unambiguously determines the absolute position. On the basis of a bit string, the series of bit strings is formed by computation or by logic elements (usually exclusive-OR gates). Rules of generation and circuits for this purpose are disclosed for instance in the literature entitled "Digital displacement transducer using pseudo-random binary sequences and a microprocessor" by B. E. Jones and K. Zia, in Trans Inst M C, Vol. 3, No. 1, January–March 1981, pages 13–20.

In addition to a code pattern that forms a code word CW, further code elements, or in other words a further pattern, and in particular at least a part of a further code pattern, are scanned as well. By the scanning of this further pattern, and in particular of at least a part of a further code pattern, additional bits are formed. The bits of the code pattern as well as the additional bits are checked for reliability, for instance by performing the above-explained monitoring of the amplitudes of the analog scanning signals S. In addition to the N bits of the code word CW, now the additional bits are also compared with the corresponding bits of the predetermined series of bit strings. In this comparison, the bits characterized as unreliable are not taken into account. If in this comparison of the N bits and of the redundant additional bits with the entire predetermined series of bit strings, only a single match of the reliable bits is found, then the absolute position stored in memory for the bit string found is assigned to the comparison code word CW. This position is unambiguous. If a plurality of matches are found in the comparison, then too many bits are unreliable, and additional error routines are required, or an error report must be issued, since at this position, an unambiguous absolute position cannot be determined.

A further error routine for instance assumes that the change between the present position and the last position can amount to only one predetermined value. If in the comparison more than one match is found, then from among the plurality of positions, that position whose spacing from the last position does not exceed the predetermined amount, or is closest to the most recently determined position, is declared valid.

It is also possible for the comparison to already be limited to a neighboring region of the most recently determined position.

The present invention will be described in still further detail in terms of a concrete example, with the aid of FIGS. 4 and 5a–5f.

It can be seen in FIG. 4 that with a three-digit word, a maximum of eight different code words and thus also eight different positions can be unambiguously distinguished from one another. The bit string of the serial, single-track and single-step pseudo-random code (PRC) is listed in the first line. Since all the possibilities are listed, this series is also known as the maximum length sequence.

Below the first line in FIG. 4, the code words scanned at each of the eight different positions are shown. These code words are each formed by the first three bits. As redundant information, in this example, the next code word in each case is scanned. These additional bits are shown in cursive. The maximum length sequence is advantageously used for angle measurement; then the maximum length sequence is used in closed form. "Closed form" means that the sequence or series of bits, such as the series (11101000) of FIG. 4, can be arranged on a closed circle and that at any arbitrary place three sequential bits are definite and unique. Therefore, in the example of FIG. 4 the code words 001 and 011 defined by the last bits and first bits of the sequence are also definite and unique.

The comparison routine will now be explained in conjunction with FIGS. 5a–5f, taking the second position as an example; in it, a bit that has been characterized as unreliable is marked with the letter F. These bits always produce one match as an outcome of the comparison. A match of bits in the comparison is marked X in FIGS. 5a–5e.

FIG. 5a shows that no erroneous bit is included in the scanning, so that upon a single comparison of the eight comparison positions, a match of all the bits occurs. This position can thus be determined unambiguously and is assessed as valid.

In FIG. 5b, one of the scanned bits has been marked with an error code F. This bit is not taken into account in the comparison; nevertheless, this position can still be unambiguously determined.

In FIG. 5c, two bits obtained by scanning have been marked with an error code F, and once again, one position can be determined unambiguously.

In FIG. 5d, three bits have already been marked as unreliable, and nevertheless, the position can be determined unambiguously.

In FIG. 5e, once again three bits are marked as unreliable, but at a different location. In this case, in the comparison, two matches are found, and so the position cannot be determined unambiguously.

In FIG. 5f it can be seen that no bit has been found unreliable, and nevertheless in the comparison, no match was found. This means that the scanning includes at least one erroneous bit, which however was not recognized by the error checker P. A doubtful mode of operation of the error checker can be ascertained as a result.

The redundantly scanned bits used for comparison are advantageously bits immediately adjacent the code word CW, but this is not a requirement. It is important that the additional or redundant bits of a further code pattern be compared correctly place by place with bits from the predetermined series.

The present invention can be used especially advantageously in a sequential single-increment Manchester code. However, the present invention is not limited to this code; it can also be used in multitrack coding. Each code element can also include only a single region, in which case each bit is obtained from only one analog scanning signal. For checking the reliability of these bits, this scanning signal is then compared in a known manner with a set-point amplitude.

The present invention can be used especially advantageously with the optical scanning principle. However, the present invention is not limited to this scanning principle, but can also be used in magnetic, inductive and capacitive scanning principles.

The position measuring instrument can be used for measuring either linear or rotary motions. The objects to be measured can be the table and carriage of a machine tool or of a coordinate measuring machine, or the rotor and stator of an electric motor.

Further exemplary embodiments exist within the scope of the present invention besides the described examples.

I claim:

1. A procedure for determining an absolute position of an object, comprising:
scanning a code pattern from a series of code patterns, wherein each code pattern of said series of code patterns unambiguously defines one absolute position and comprises a plurality of code elements;
scanning additional code elements;
forming a code word with a plurality of bits by said scanning said code pattern;
forming additional bits from said scanning said additional code elements;
checking said plurality of bits of said code word and said additional bits for reliability, and if one of said plurality of bits and said additional bits fails to attain predetermined criteria, it is assigned an error code;
predetermining a series of bit strings, with one absolute position being unambiguously assigned to each one of said bit strings;
comparing said bits of said code word with said predetermined series of bit strings and comparing said additional bits with corresponding bits from said predetermined series of bit strings, and if a match of all of said bits of said code word and said predetermined series of bits strings occurs, assigning a corresponding absolute position to said code word, and upon comparison for a match, any bits assigned an error code are not taken into account.

2. The procedure of claim 1, wherein said additional code elements are at least one portion of a further code pattern from said series of code patterns.

3. The procedure of claim 2, wherein said scanning of said series of code patterns results in generation of a plurality of analog scanning signals, wherein for forming one bit, at least one of said plurality of scanning signals is used.

4. The procedure of claim 1, wherein said scanning of said series of code patterns results in generation of a plurality of analog scanning signals, wherein for forming one bit, at least one of said plurality of scanning signals is used.

5. The procedure of claim 4, wherein said checking comprises comparing a signal amplitude of said scanning signal used to form said one bit with a set-point amplitude.

6. The procedure of claim 4, further comprising forming a bit from two scanning signals, and checking said formed bit for reliability by comparing a difference of said two scanning signals with a set-point difference.

7. The procedure of claim 1, wherein said predetermining said series of bit strings and said assigning said corresponding absolute position is effected by a table of associations stored in a memory.

8. The procedure of claim 1, wherein said predetermining said series of bit strings and said assigning said corresponding absolute position is effected in accordance with a rule of generation.

9. A position measuring instrument comprising:
   a code that comprises a series of code patterns, wherein each code pattern of said series of code patterns unambiguously defines one absolute position and comprises a plurality of code elements;
   a scanner that is movable in a measurement direction relative to said code, said scanner compromising a light source that generates light that scans said code so that said code generates modulated light;
   a detector that detects said modulated light and generates scanning signals;
   an evaluation unit that receives said scanning signals and forms a code word with a plurality of bits and forms additional bits from scanning said code, said evaluation unit 1) checking said plurality of bits of said code word and said additional bits for reliability, and if one of said plurality of bits and said additional bits fails to attain predetermined criteria, it is assigned an error code, 2) predetermining a series of bit strings, with one absolute position being unambiguously assigned to each one of said series of bit strings and 3) comparing said bits of said code word with said predetermined series of bit strings and comparing said additional bits with corresponding bits from said predetermined series of bit strings, and if a match of all of said bits of said code word and said predetermined series of bits strings occurs, assigning a corresponding absolute position to said code word, and upon comparison for a match, any bits assigned an error code are not taken into account.

10. The position measuring instrument of claim 9, wherein said code comprises a series of equal-length code elements succeeding one another in said measurement direction.

11. The position measuring instrument of claim 10, wherein each of said code elements comprises two equal-length partial regions, disposed side by side in immediate succession in said measurement direction X.

12. The position measuring instrument of claim 11, wherein said partial regions are complementary to one another.

13. The position measuring instrument of claim 9, wherein said detector comprises a series of detector elements disposed in said measurement direction, wherein in every relative position, at least one said series of detector elements is unambiguously associated with each of said two partial regions.

14. A procedure for determining an absolute position of an object, comprising:
   scanning a code pattern from a series of code patterns, wherein each code pattern of said series of code patterns unambiguously defines one absolute position and comprises a plurality of code elements;
   forming a code word with a plurality of bits by said scanning said code pattern;
   checking said plurality of bits of said code word for reliability, and if one of said plurality of bits fails to attain predetermined criteria, it is assigned an error code;
   predetermining a series of bit strings, with one absolute position being unambiguously assigned to each one of said series of bit strings;
   comparing said bits of said code word with said predetermined series of bit strings, and if a match of all of said bits of said code word and said predetermined series of bits strings occurs, assigning a corresponding absolute position to said code word, and upon comparison for a match, any bits assigned an error code are not taken into account.

* * * * *